Nov. 14, 1939.                L. S. WEBB                2,179,766
                          INSECT EXTERMINATOR
                        Filed March 13, 1939          2 Sheets-Sheet 1
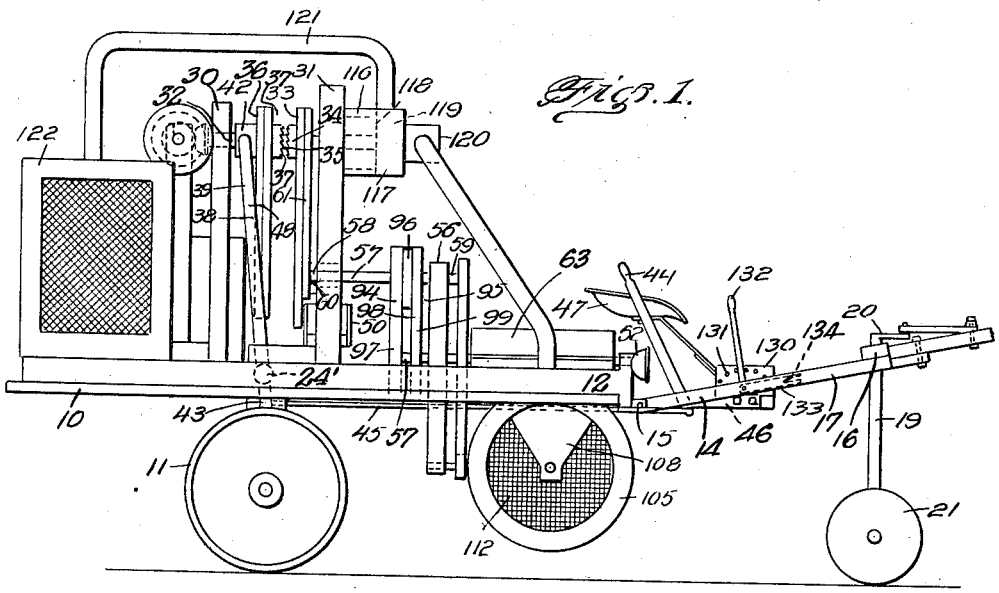
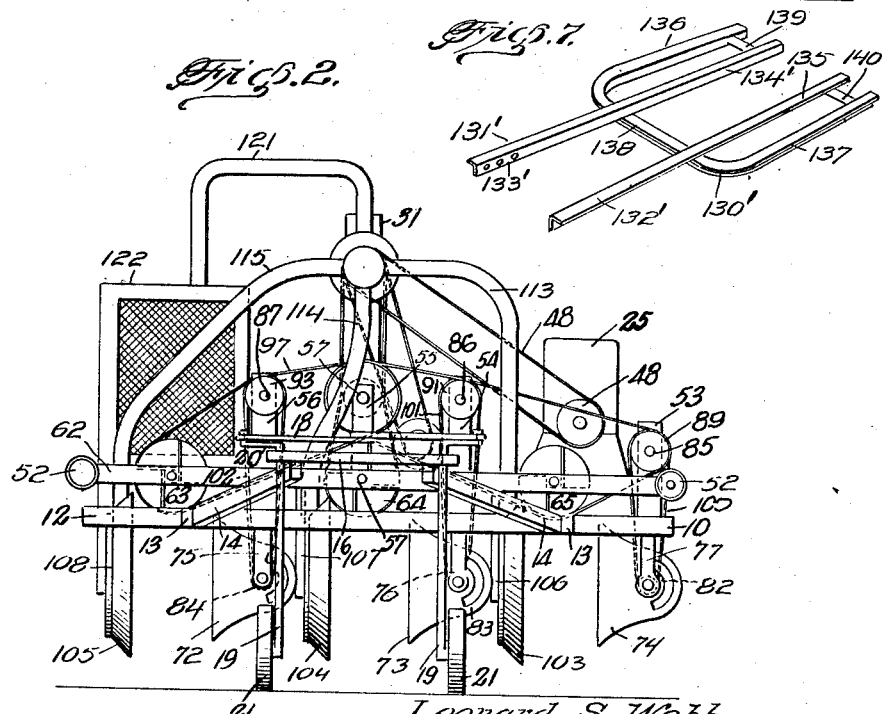
Leonard S. Webb, INVENTOR
By Victor J. Evans & Co.
ATTORNEYS Nov. 14, 1939.    L. S. WEBB    2,179,766
INSECT EXTERMINATOR
Filed March 13, 1939    2 Sheets-Sheet 2
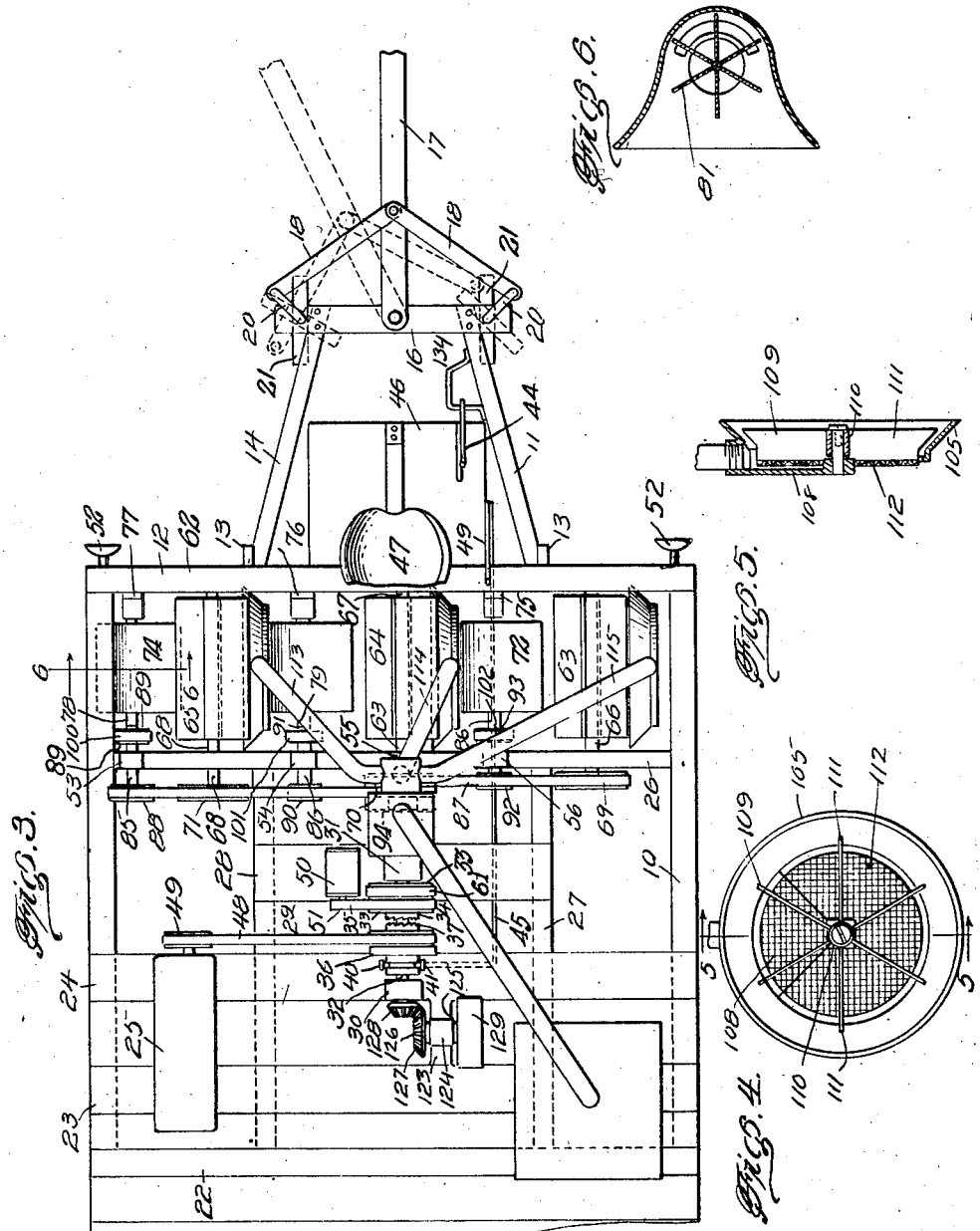
Leonard S. Webb, INVENTOR
BY Victor J. Evans & Co.
ATTORNEYS Patented Nov. 14, 1939

2,179,766

UNITED STATES PATENT OFFICE 2,179,766

INSECT EXTERMINATOR

Leonard S. Webb, Midland, Tex.

Application March 13, 1939, Serial No. 261,534

7 Claims. (Cl. 43—140)

My invention relates to a new and useful apparatus for exterminating insects.

An important object of my invention is the provision of an insect exterminator that will efficaciously operate on a great variety of plants to free them of such insect parasites as boll weevils, cornear worms, boll worms, coddling moths, cotton flea hoppers, and the like.

Another object of my invention is the provision of a device that will clean and rejuvenate overflowed crops as well as rid them of their insect pests.

Yet another object of my invention is the provision of an insect exterminator that is adapted to operate upon several rows of plants simultaneously.

Still another object of my invention is the provision of an insect exterminator that is durable in its construction and efficient and efficacious in its operation.

Other objects and advantages of my invention will be apparent during the course of the following description.

In the drawings, forming a part of this specification, and in which like numerals are employed to designate like parts throughout the same, Figure 1 is a side elevation of a device embodying my invention, Figure 2 is a front elevation thereof, Figure 3 is a top plan view of the same, Figure 4 is a front elevation of a collector disc and fan, embodying a part of my invention, Figure 5 is a vertical sectional view, taken on the line 5—5 of Figure 4, Figure 6 is a vertical sectional view of a blower fan, embodying a part of my invention, and Figure 7 is a perspective view of a supporting frame adapted to be used in association with my device.

In the accompanying drawings, wherein for the purpose of illustration, is shown a preferred embodiment of my invention, the numeral 10 designates a supporting frame constructed of angle irons, or the like, which carries the various coacting parts embodying my invention. The frame 10 is of substantially square formation in plan and is provided at substantially its middle with a pair of detachable wheels 11. The wheels 11 are spaced to straddle a row of growing vegetation and may be laterally adjustable to properly accommodate varying widths of rows. The frame 10 is preferably of sufficient width to overlie a plurality of rows of vegetation, and is here illustrated as being capable of accommodating three rows simultaneously.

The forward part 12 of the frame 10 is provided with forwardly projecting shanks 13 to which the bars 14 are pivotally secured by means of the pintles 15. The bars 14 are outwardly convergent and their extremities are connected by the cross arm 16. A tongue 17 is pivotally carried by the cross arm 16 at substantially its middle and intermediate of the extremities of the bars 14. The steering arms 18 are pivotally carried by the tongue 17 a substantial distance from its point of connection to the cross arm 16 and the outer ends thereof are connected to the extremities of the said cross arm by means of the wheel supporting rods 19. The upper ends of the vertically disposed rods 19 are bent laterally to form a guiding link 20 and the lower ends thereof receive the front wheels 21.

The frame 10 is formed adjacent its rear edge 22 with a pair of spaced transversely positioned supporting bars 23 and 24 which carry the engine 25 thereon. A transversely positioned supporting bar 26 is carried by the frame adjacent the front 12 and in spaced parallelism with the rear supporting members 23 and 24. The longitudinally extending braces 27 and 28 connect the transverse supporting members 23, 24 and 26 with the rear edge 22, and a transverse web 29 connects the longitudinal supporting braces 27 and 28 intermediate the supporting bars 24 and 26 and in spaced parallelism therewith.

The vertically disposed bearing supports 30 and 31 are carried by the transverse supporting bar 24 and web 29 at substantially the middle of the frame 10, and the main shaft 32 is journaled in horizontally aligning openings adjacent the top thereof. A double belt pulley 33 is keyed to the shaft 32 adjacent the vertical support 31, and the hub 34 of the pulley is provided with radial teeth 35. The pulley 36 is slidably mounted on the shaft 32 and with the hub thereof provided with radial teeth 37 adapted to engage with the teeth 35 of the stationary pulley 33.

The clutch actuating arm 38 is pivotally mounted in an elongated slot in the transverse supporting bar 24, as at 24', and the upper end 39 thereof is formed with bifurcations 40 and 41 which embrace the outer hub 42 of the slidable pulley 36. The depending end 43 of the arm 38 is connected to a manual operating handle 44 by the link 45. The handle 44 is pivotally attached to the edge of the operator's platform 46 which projects forwardly of the frame 10 intermediate of the bars 14 and carries an operator's seat 47 of conventional construction. It may thus be seen that the operator may sit in the seat 47 and manually engage or disengage the clutch in the main shaft 32. A belt 48 connects the power pulley 49 of the engine 25 and the slidable pulley 36 to impart rotation thereto, and consequently to impart rotation to the main shaft 32 when the clutch face 37 is engaged with the companion clutch face 35 of the pulley 33.

A generator 50 is mounted on the web 28 and is driven from the double pulley 33 by a belt 51. The generator 50 supplies sufficient electric power to energize the lamps 52 carried by the frame 10 at either end of the forward part 12 thereof, and which permits the device to be operated after dark, if desired.

The transverse supporting bar 26 carries the spaced vertically disposed bearing arms 53, 54, 55 and 56, and the bearing arms 53, 54 and 56 extend a substantial distance below the plane of the frame 10, as illustrated in Figure 1. A jack shaft 57 is mounted for rotation in horizontally aligning openings in the vertical supports 55 and 31, and either end 58 and 59 thereof extends beyond the supporting arms 31 and 55. The extending end of 58 of the jack shaft carries a pulley 60 and a driving belt 61 is entrained about the pulley 60 on the jack shaft and the double pulley 33 on the drive shaft 32.

A transverse supporting bar 62 is maintained in space parallelism above the forward edge 12 of the frame 10, and the rotary spankers 63, 64 and 65 are mounted between the supporting bar 62 and the supporting bar 26. The spindles 66, 67 and 68 of the spankers coextend a substantial distance rearwardly of the supporting arm 26 and pulleys 69, 70 and 71 are firmly secured thereon. The spankers are formed with substantially circular end walls between which radially extending blades are mounted, and the spankers are uniquely-positioned in a manner whereby they will be directly over adjacent rows of vegetation when the device is in operation.

The campanular blower housings 72, 73 and 74 are suspended from the forward edge 12 of the frame 10 by means of the brackets 75, 76 and 77, and the open side of each of the blower housings is positioned so that it will be adjacent one side of a row of vegetation when the device is moved down the field. The depending portions of the vertical support 53, 54 and 56 carry rotatable shafts 78, 79 and 80, the inner ends of which project into the blower housings and have fans 81 rotatably mounting therein, as illustrated in Figure 6. The other ends of the shafts 78, 79 and 80 have pulleys 82, 83 and 84 keyed thereon intermediately the depending portions of the supports 53, 54 and 56 and the blower housings 72, 73 and 74.

The upper portions of the vertical supports 53, 54 and 56 have stub shafts 85, 86 and 87 rotatably mounted in openings provided adjacent the tops thereof. The stub shaft 85 has pulleys 88 and 89 mounted for rotation therewith on either side of support 53. The stub shaft 86 has pulleys 90 and 91 similarly mounted on either side of support 54, and the stub shaft 87 has the pulleys 92 and 93 mounted for rotation therewith on either side of the support 56.

The jack shaft 57 has a pair of spaced pulleys 94 and 95 mounted for rotation therewith intermediate of the supports 31 and 55, and a substantially smaller pulley 96 is positioned between the pulleys 94 and 95. The circumjacent belt 97 connects the pulley 44 of the jack shaft, pulley 69 of the spanker 63 and pulley 92 of the stub shaft 87. The belt 98 connects the pulley 96 of the jack shaft and the pulley 70 of the intermediate spanker 64. The circumjacent belt 99 connects the pulley 95 of the jack shaft, pulley 71 of the spanker 65, pulley 88 of the stub shaft 85, and the pulley 90 of the stub shaft 86. The pulleys 89, 91 and 93 carried by the stub shaft 85, 86 and 87 are connected to the pulleys 82, 83 and 84 of the blower fans 72, 73 and 74 by belts 100, 101 and 102. It may thus be seen that when rotation is imparted to the jack shaft 57 from the main shaft 32 by the belt 61, the rotary motion will be imparted through the various belt systems to the spankers, and to the blower fans rotatably disposed in the blower housings 72, 73 and 74.

The collector discs 103, 104 and 105 are carried by the frame and with the open face thereof spaced from and opposed to the open faces of the blower housings, and the distance therebetween is sufficient to permit a row of vegetation to pass therethrough. The back sides of the collector discs are open except for the segmental webs 106, 107 and 108. The lower ends of the webs carry inwardly projecting spindles to which the fans 109 are rotatably mounted. The fans 109 include a hub member 110 and a plurality of radially disposed blades 111 which have a screening 112 secured to their back edges and within the said collector discs. The upper portions of the rear webs 106, 107 and 108 are formed with an internally threaded boss into which is fitted the pendant open end of pipes 113, 114, and 115. The open end of the pipes will communicate with the interior of the collector discs between the uppermost adjacent blades 111 of the fans 109. The webs 106, 107 and 108 are segmental in their formation to provide a backing member for the segment of the discs below the pipes and between the uppermost adjacent blades of the fan.

The forwardly projecting end of the main shaft 32 carries a fan 116 rotatably mounted thereon forwardly of the vertical support 31 and enclosed by a suitable housing 117. The housing 117 extends substantially forwardly of the fan, and the forward portion 119 thereof is separated therefrom by a transverse closure screen 118. The portion 119 of the housing is formed with a forwardly extending auxiliary housing 120 which receives the upper ends of the pipes 113, 114 and 115. An exhaust pipe 121 communicates at one end with the compartment 119 of the housing 117 and at its other end thereof with a suitable screened receptacle 122 positioned at the rear of the frame 10.

The transverse web 123 bridges the supports 23 and 24 and is formed with a vertically disposed bearing support 124. The stub shaft 125 is rotatably mounted in an opening provided adjacent the top of the bearing support 124. The end 126 of the shaft 124 has bevelled gear 127 keyed thereon and adapted to enmesh with the bevelled gear 128 carried by the outwardly extending end of the main shaft 32. The other end of the stub shaft 125 has the pulley 129 mounted thereon and adapted to be connected to the power shaft of a tractor.

A vertically disposed plate 130 is carried by the operator's platform 46 and a plurality of spaced arcuately positioned apertures 131 are provided therein. The hand lever 132 is pivotally attached to the plate 130 at substantially the middle thereof and is formed with an angularly disposed arm 133, the end of which is bifurcated to embrace the inwardly extending bracket 134. The hand lever 132 may be manually angularly positioned by inserting pins in adjacent openings 131 of the plate 130 and because of the pivotal connection of the bars 14 with the frame the forward end of the said frame may be raised or lowered by angularly adjusting the handle 132.

The operation of my device is as follows:

If the apparatus is to be horse-drawn the animals are attached to the tongue 17 in the conventional manner, and the device is drawn through the field to be treated with the front wheels 21 and rear wheels 11 on either side of a row of vegetation. When positioned in this manner, the blower fan 73 and collector disc 104 will face opposite sides of the middle row and the blower fans 74 and 72 and collector discs 103 and 105 will be disposed on opposite sides of the adjacent rows of vegetation.

It may thus be seen that the device is adapted to simultaneously treat three rows of vegetation. When the device is horse drawn the engine 25 is used to impart rotation to the main shaft 32 through the belt 48 and the operator on the seat 47 may manually actuate the hand lever 44 to engage and disengage the clutch faces 35 and 37 on the pulleys 33 and 36. When the handle 44 is moved forwardly, the bifurcated arms 40 and 41 of the lever 38 will move the pulley 36 longitudinally along the main shaft 32 and will therefore move the clutch face 37 thereof into engagement with the clutch face 35 to impart rotation to the main shaft 32. When the main shaft is rotating, the generator 50 will be actuated to supply electric power to the headlights 52 and the jack shaft 57 disposed therebelow will be rotated by means of the belt 61, as hereinbefore described. The rotation of the jack shaft 57 will impart rotation to each of the spankers 63, 64 and 65 and to each of the fans 81 in the blower housings 72, 73 and 74. When the fans 81 in the said blower housings are rotated they will generate a strong blast of air that will blow transversely through the row of vegetation and into the respective collector discs 103, 104 and 105. The blast of air will be sufficiently intense to cause the rotation of the fans 109 rotatably mounted in each of the collector discs, and any insects resting on the plants will be blown from their position and impinged against the screen member 112 carried by the rotating fan blades 111 of the fans 109. Inasmuch as the screen is rotatable with the fan blades, the insects will be held thereon by the blast of air generated by the blower fans and will be rotated to the uppermost position under the lower ends of the suction pipes 113, 114 and 115. When the main shaft 32 is actuated the fan 116 on the forward end thereof will rotate therewith to create a strong suction in the suction pipes 113, 114 and 115, and as the insects reach the uppermost position in the collector discs, the segmental webs 106, 107 and 108 will stop the blast of air from passing through the screen 112 and will create a back pressure thereon sufficient to release the insects and to permit the suction formed in the pipes 113, 114 and 115 by fan 116 to draw them into the housing 120. The fan 116 will then force them through the pipe 121 and into the screened receptacle 122. The receptacle 122 is sufficiently large to hold a large number of the insects, and after it has become sufficiently filled, may be removed from the frame and the insects disposed of in any desirable manner.

If the row of vegetation is sufficiently high to extend above the blower fans, the tops thereof will be agitated by the blades of the slowly revolving spankers 63, 64 and 65, and any of the insect parasites resting thereon will be shaken therefrom and caused to fall into the blast of air generated by the blower fans. They will be carried by the blast of air into the collector disc 105 and disposed of in the manner hereinbefore described.

When the device is adapted to be carried by a tractor, the rear wheels 11 are removed, and the pintles 15 are withdrawn to permit the release of the arms 14 and consequently the forward steering appurtenances in their entirety.

I have constructed an angular frame 130' comprising spaced longitudinally extending members 131' and 132 having a plurality of openings 133' in the vertical web thereof to permit the same to be bolted, or otherwise secured, to the forward end of a tractor. The ends 134' and 135 of the members 131' and 132' are adapted to underlie the longitudinal braces 27 and 28 of the frame 10, and a pair of laterally disposed braces 136 and 137 are connected to the said longitudinal members by the transverse brace 138. The members 136 and 137 underlie either side of the frame 10, and the forward ends of the supports 136 and 137 are joined to the longitudinal members by braces 139 and 140. It may thus be seen that the device will be supported from the forward end of the tractor and that a belt may be connected to the power shaft of the tractor and to the pulley 129 to impart rotation to the main shaft 32 through the bevelled gears 127 and 128. When the device is carried by a tractor, the clutch on the main shaft 32 is engaged at all times and the tractor clutch is used to start or stop the actuation of the blower fans and spankers.

It is to be understood that the form of my invention, herewith shown and described, is to be taken as a preferred example of the same, and that various changes in the size, shape and arrangement of parts may be resorted to without departing from the spirit of my invention, or the scope of the appended claims.

Having thus described my invention, I claim:

1. An insect exterminator comprising, opposed fans on opposite sides of a row of vegetation, means to rotate one of said fans to create a blast of air transversely of the said row of vegetation to blow insect pests on the said vegetation into the other of the said fans, and suction means to remove the insects from the said last-mentioned fan.

2. An insect exterminator comprising opposed fans on opposite sides of a row of vegetation, means to rotate one of said fans to create a blast of air transversely of the said row of vegetation to blow insect pests on the said vegetation into the other of the said fans, and means to remove the insects from the said last-mentioned fan.

3. An insect exterminator comprising a device adapted to simultaneously straddle a plurality of adjacent rows of growing vegetation, having blowers on one side of the said rows of vegetation, means to drive the blowers to create a blast of air transversely of the said rows, and a receiving receptacle opposed to the said blowers and on the opposite side of the rows of vegetation to accommodate insects blown from the vegetation by the said blowers.

4. An insect exterminator comprising a device adapted to simultaneously straddle a plurality of adjacent rows of growing vegetation, having blowers on one side of the said rows of vegetation, means to drive the blowers to create a blast of air transversely of the said rows, a receiving receptacle opposed to the said blowers and on the opposite side of the rows of vegetation to accommodate insects blown from the vegetation by the said blowers, suction means connected to the said receiving receptacles, and a container communicating with the said suction means to hold the insects drawn from the receiving receptacles by the said suction means.

5. An insect exterminator comprising a device adapted to simultaneously straddle a plurality of adjacent rows of growing vegetation, having blowers on one side of the said rows of vegetation, means to drive the blowers to create a blast of air transversely of the said rows, a receiving receptacle opposed to the said blowers and on the opposite side of the rows of vegetation to accommodate insects blown from the vegetation by the said blowers, suction means connected to the said receiving receptacles, a container communicating with the said suction means to hold the insects drawn from the receiving receptacles by the said suction means, and spankers disposed above the said rows of vegetation to agitate the same to dislodge the insects in a manner to cause them to fall into the said transverse blast of air.

6. In an insect exterminator comprising a device adapted to straddle a growing row of vegetation, the combination of opposed fans disposed on opposite sides of the said row, means to rotate the said fans to create a blast of air transversely of the said row, screen means carried by and rotatable with one of the fans to hold insects impinged thereon by the said blast of air, and a suction means communicating with the said last-mentioned fan to draw the said insects from the said screen means.

7. An insect exterminator comprising, opposed fans on opposite sides of a row of vegetation, means to rotate one of said fans to create a blast air transversely of the said row of vegetation to blow insect pests on the said vegetation into the other of said fans, screen means carried by the said last-mentioned fans to hold the insects impinged thereagainst, and suction means to remove the insects from the said screen means.

LEONARD S. WEBB.